United States Patent [19]
Takeda et al.

[11] Patent Number: 5,792,995
[45] Date of Patent: Aug. 11, 1998

[54] WIRE HARNESS GROMMET WITH TUBULAR SECTION AND FASTENER

[75] Inventors: Ikuo Takeda, Shizuoka; Toshihiko Yamazaki, Aichi, both of Japan

[73] Assignees: Yazaki Corporation; Mitsubishi Jidosha Kogyo Kabushiki Kaisha, both of Tokyo, Japan

[21] Appl. No.: 555,228

[22] Filed: Nov. 8, 1995

[30] Foreign Application Priority Data

Nov. 8, 1994 [JP] Japan ................... 6-273832

[51] Int. Cl.$^6$ ................... H01B 17/26
[52] U.S. Cl. ................... 174/153 G; 174/656; 174/151
[58] Field of Search ................... 174/151, 152 R, 174/153 R, 152 G, 153 G, 154, 166 R, 11 BH, 12 BH, 14 BH, 18, 31 R, 31.5, 50.57, 62, 65 R, 65 G, 655 S, 72 A, 72 C, 75 B, 74 A

[56] References Cited

U.S. PATENT DOCUMENTS

| | | | |
|---|---|---|---|
| 2,161,860 | 6/1939 | Gentsch | 174/164 |
| 3,152,219 | 10/1964 | Murray et al. | 174/72 A |
| 3,802,654 | 4/1974 | Jenko et al. | 248/73 |
| 5,046,464 | 9/1991 | Hisatomi et al. | 123/143 C |
| 5,126,507 | 6/1992 | Kirma | 174/2 |

FOREIGN PATENT DOCUMENTS

| | | |
|---|---|---|
| 63-37027 | 3/1988 | Japan . |
| 64-20612 | 2/1989 | Japan . |
| 64-21925 | 2/1989 | Japan . |
| 5-62133 | 8/1993 | Japan . |

*Primary Examiner*—Hyung S. Sough
*Assistant Examiner*—Kamand Cuneo
*Attorney, Agent, or Firm*—Morgan, Lewis & Bockius LLP

[57] ABSTRACT

There is provided a harness-fixing construction of a grommet in which an upwardly-extending wire assembly portion can be positively fixed to a tubular portion of the grommet, and the efficiency of a wire harness-installing operation is enhanced. The grommet includes a proximal portion for fitting watertight in a panel hole, the tubular portion of a generally L-shape extending downwardly from the proximal portion, and a protuberance portion which is formed integrally with the proximal portion and the tubular portion, and has a concave surface. The grommet has a passage hole for passing a fastening band (fixing member) therethrough. A holding mechanism for stably holding the upwardly-extending wire assembly portion in a desired position is formed by the passage hole for passing the fastening band therethrough, and the protuberance portion having the concavely-curved surface for holding the upwardly-extending wire assembly portion in a generally embracing manner. This concave surface extends in a direction of the length of the tubular portion, and the upwardly-extending wire assembly portion, when fitted in the concave surface in the longitudinal direction, is positioned properly.

16 Claims, 6 Drawing Sheets

WIRE HARNESS GROMMET WITH TUBULAR SECTION AND FASTENER

BACKGROUND OF THE INVENTION

1. Field of the Invention

This invention relates to a harness-fixing construction of a grommet used for installing a wire harness, extending from an engine room of an automobile or the like, in a room through a panel hole. More specifically, the invention relates to a harness-fixing construction of a grommet, in which the wire harness, folded back to provide a drain portion, is fixed to the grommet by the use of a fixing member.

2. Background

For installing a wire harness of an automobile or the like through a panel, various kinds of waterproof grommets have heretofore been put into practical use, in which the wire harness is held on the panel, and water or the like is prevented from intruding into a room along the wire harness. However, water or the like may intrude through small gaps between sheaths of a plurality of wires forming the wire harness, and therefore generally the wire harness is bent into a U-shape to provide a so-called drain portion which serves to remove the water passed through the gaps.

In one known conventional fixing construction for forming a drain portion of a wire harness is disclosed in Unexamined Japanese Utility Model Publication No. 63-37027.

As shown in FIG. 7, a grommet 61 is fitted at its proximal portion in a panel hole 42 in a dashpanel P, with a tubular portion 55 directed downwardly. A downwardly-extending wire assembly portion 54, passed through the tubular portion 55, is bent into a U-shape to provide a drain portion 57. An upwardly-extending wire assembly portion 56 is arranged in a desired direction, and then a tape 63 is firmly wound on the tubular portion 55, the downwardly-extending wire assembly portion 54 and the upwardly-extending wire assembly portion 56. By thus winding the tape 63, a wire assembly 52 is formed into a U-shape. Namely, the tape 63 is used as a fixing member for fixing the upwardly-extending wire assembly portion 56 in the desired position.

However, for forming the above fixing construction, a large amount of the tape needs to be wound on the relevant portions, and there arises a problem with respect to the efficiency of the operation.

Next, a fixing construction, having an improved drain portion of a wire harness over the above fixing construction, will be described.

A grommet 51 shown in FIG. 8 includes a proximal portion 53 for holding a tape-wound wire assembly 52, such as a wire harness, watertight in a panel hole in a dashpanel P, and a tubular portion 55 for downwardly bending the wire assembly 52 extending from the proximal portion 53 and for passing a downwardly-extending wire assembly portion 54 therethrough. A lower end portion of the downwardly-extending wire assembly portion 54 is bent into a U-shape, and the tape is removed from the U-shaped portion, thus providing a drain portion 57. A fastening band 59 is used as a fixing member for fixedly holding an upwardly-extending wire assembly portion 56 on the front side of the tubular portion 5.

Although the upwardly-extending wire assembly portion 56 is fixedly secured to the front side of the tubular portion 55 by the fastening band 59 as shown in FIG. 9, the upwardly-extending wire assembly portion 56 can be fixed to a desired portion of the surface of the tubular portion 55 in the range from the left side to the right side (FIG. 9).

However, when the upwardly-extending wire assembly portion 56 is displaced out of position by vibrations from an engine and the traveling ground, this causes the shaking of the wire assembly, and also causes noises.

In the harness-fixing construction employing the conventional grommet 61, the tape 63 is wound in an overlapping manner on the tubular portion 55, the downwardly-extending wire assembly portion 54 and the upwardly-extending wire assembly portion 56. Therefore, considerable time is required for winding the tape 63, thus inviting a problem that the efficiency of the operation is low.

In the harness-fixing construction employing the grommet 51, the position of fastening of the upwardly-extending wire assembly portion 56 to the tubular portion 55 is not fixed, and the upwardly-extending wire assembly 56 can be fixed to any desired portion by the fastening band 59. However, when the fastening by the fastening tape 59 becomes even slightly loosened, the upwardly-extending wire assembly portion 56 is displaced out of the desired position with respect to the tubular portion 55, thus inviting problems that the shaking of the wire assembly causes and also producing noise.

SUMMARY OF THE INVENTION

With the above problems in view, it is an object of this invention to provide a harness-fixing construction of a grommet in which an upwardly-extending wire assembly portion can be positively fixed to a tubular portion of the grommet, and the efficiency of a wire harness-installing operation is enhanced.

The above object has been achieved by a harness-fixing construction of a grommet including a proximal portion for holding a tape-wound wire assembly in a panel hole in a watertight manner; a tubular portion formed integrally with the proximal portion for directing the wire assembly downwardly, a downwardly-extending wire assembly portion, extending from the tubular portion, being bent into a U-shape to provide a drain portion, and an upwardly-extending wire assembly portion extending upwardly from the drain portion; and a fixing member for fixing the upwardly-extending wire assembly portion to the tubular portion; and a holding mechanism for stably holding the upwardly-extending wire assembly portion in a predetermined position formed at least on a predetermined portion of the proximal portion or a predetermined portion of the tubular portion.

The above object can be achieved by a construction in which the holding mechanism includes at least one passage hole for holding the fixing member.

The above object can be achieved by a construction in which the holding mechanism includes a protuberance portion having a concave surface for holding at least the upwardly-extending wire assembly portion in a generally embracing manner.

The above object can be achieved by a construction in which the holding mechanism includes at least one passage hole for holding the fixing member, and a protuberance portion having a concave surface for holding at least the upwardly-extending wire assembly portion in a generally embracing manner.

The above object can be achieved by a construction in which the holding mechanism includes at least one passage hole for holding the fixing member, and a protuberance portion holding at least the upwardly-extending wire assembly portion.

In the harness-fixing construction of the grommet according to the invention, the holding mechanism for stably

3 holding the upwardly-extending wire assembly portion in a predetermined position is formed at least on the predetermined portion of the proximal portion or the tubular portion of the grommet.

With this construction, the wire assembly is first passed through the tubular portion, and a tape is wound on a lower end portion of the tubular portion and the downwardly-extending wire assembly portion extending from the lower end of the tubular portion. Then, a portion of the downwardly-extending wire assembly portion that is not tape-wound, is bent into a U-shape to form the drain portion. Then, the tape-wound, upwardly-extending wire assembly portion is held against the holding mechanism provided at least at the predetermined portion of the proximal portion or the predetermined portion of the tubular portion, and is fixed and fastened by the fixing member. Finally, the proximal portion of the grommet is fitted in the panel hole, thus completing the fixing of the wire harness.

The holding mechanism can be formed by at least one passage hole for holding the fixing member, and by passing the fixing member through the passage hole, the wire assembly can be positively held in the predetermined position.

The holding mechanism can be formed by the protuberance portion having the concave surface for holding at least the upwardly-extending wire assembly portion in a generally embracing manner, and therefore the outer peripheral surface of the upwardly-extending wire assembly portion is held in contact with the concave surface in an embracing manner, and is held in the predetermined position easily and firmly.

The holding mechanism can be formed by at least one passage hole for holding the fixing member, and the protuberance portion having the concave surface for holding at least the upwardly-extending wire assembly portion in a generally embracing manner. Therefore, the upwardly-extending wire assembly portion is firmly fixed in the predetermined position of the grommet by a simple operation.

The holding mechanism can be formed by at least one passage hole for holding the fixing member, and the protuberance portion holding at least the upwardly-extending wire assembly portion. Therefore, the upwardly-extending wire assembly portion is firmly fixed in the predetermined position of the grommet by a simple operation.

4

Figure 8:
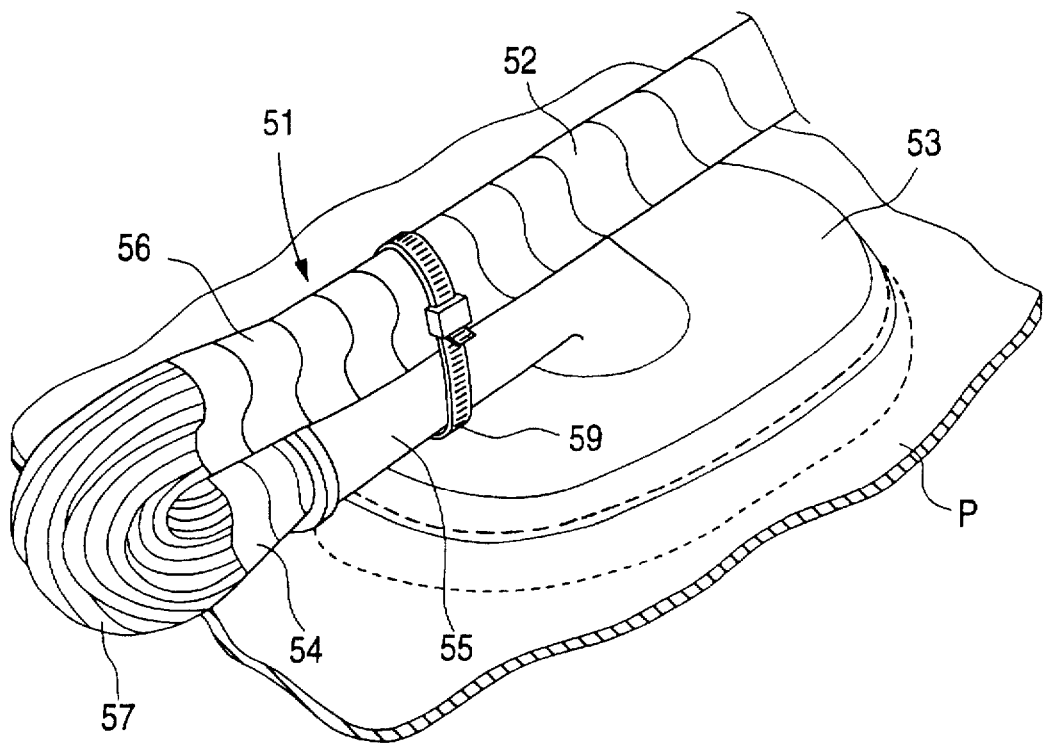
Figure 9:
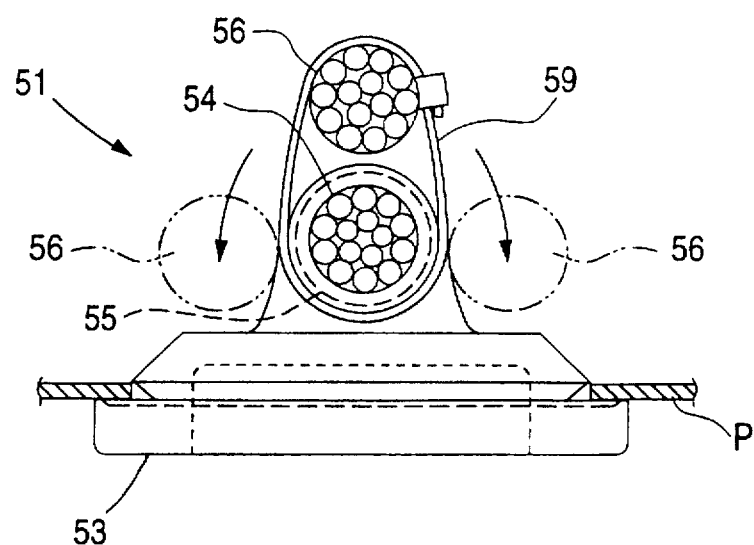

FIG. 8 is a perspective view showing another conventional harness-fixing construction of a grommet; and FIG. 9 is a view showing the operation of the construction of FIG. 8.

DETAILED DESCRIPTION OF THE PREFERRED EMBODIMENTS

Figure 1:
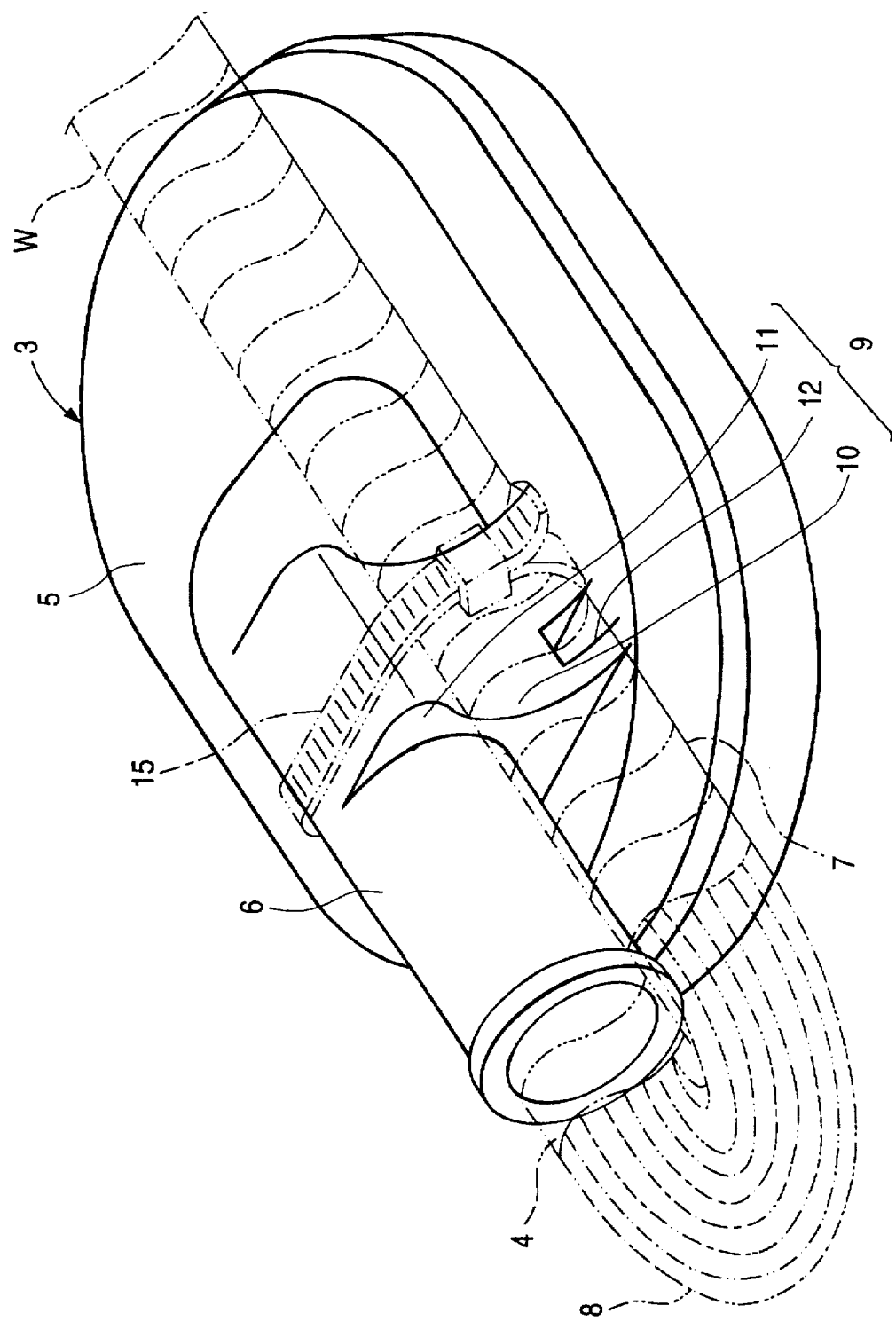
FIG. 1 is a perspective view of a first embodiment of a grommet of the invention.

A first embodiment of a harness-fixing construction of a grommet of the present invention will now be described in detail with reference to FIGS. 1 to 3. FIG. 1 is a perspective view of this embodiment of the harness-fixing construction of the grommet, FIG. 2 is a front-elevational view of the construction of FIG. 1, and FIG. 3 is a perspective view showing a condition in which the fixing of an upwardly-extending wire assembly portion of FIG. 1 is completed.

Figure 2:
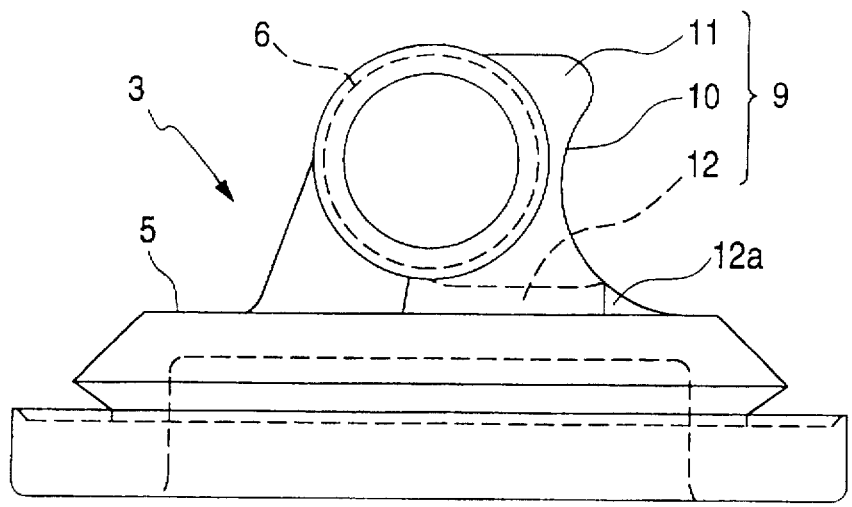
FIG. 2 is a front-elevational view of the grommet of FIG. 1.

As shown in FIGS. 1 and 2, the grommet 3 includes a proximal portion 5 for fitting watertight in a panel hole, a tubular portion 6 of a generally L-shape extending downwardly from the proximal portion 5, and a protuberance portion 11 which is formed integrally with the proximal portion 5 and the tubular portion 6, and has a concave surface 10. The grommet 3 has a passage hole 12 for passing a fastening band (fixing member) therethrough. A wire assembly (wire harness) W includes a downwardly-extending wire assembly portion 4 extending downwardly through the tubular portion 6, a drain portion 8 bent into a U-shape, and an upwardly-extending wire assembly 7 for being fixed to the grommet 3.

In the above construction, a holding mechanism for stably holding the upwardly-extending wire assembly portion 7 in a desired position is formed by the passage hole 12 for passing the fastening band 15 therethrough, and the protuberance portion 11 having the concavely-curved surface 10 for holding the upwardly-extending wire assembly portion 7 in a generally embracing manner. This concave surface 10 extends in a direction of the length of the tubular portion 6, and the upwardly-extending wire assembly portion 7, when fitted in the concave surface 10 in the longitudinal direction, is positioned properly. The fastening band 15 is of a construction commonly used for fastening a wire harness.

Figure 3:
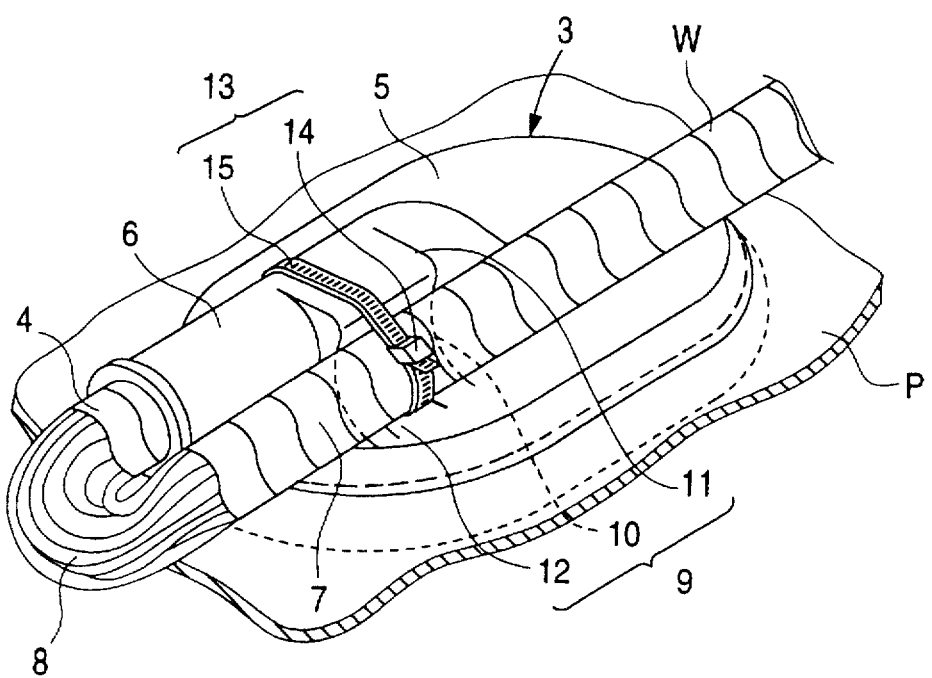
FIG. 3 is a perspective view showing a condition in which the fixing of an upwardly-extending wire assembly portion of FIG. 1 is competed.

For installing the wire assembly W in this embodiment, the downwardly-extending wire assembly portion 4 is downwardly passed through the tubular portion 6 of the grommet 3, and is bent into a U-shape, thereby providing the upwardly-extending wire assembly portion 7, as shown in FIG. 3. The U-shaped lower end portion, provided between the downwardly-extending wire assembly portion 4 and the upwardly-extending wire assembly portion 7, forms the drain portion 8 on which a tape is not wound. Water or the like, flowed through gaps between wires of the downwardly-extending wire assembly portion 4, drop from the drain portion 8, and also water or the like, flowed through gaps between wires of the upwardly-extending wire assembly portion 7, drops from the drain portion 8.

The upwardly-extending wire assembly portion 7 is brought into contact with the concave surface 10 of the protuberance portion 11, and is thus positioned. Then, this wire assembly portion 7 is fastened and fixed in position by the fastening band 15 with a lock member 14 which has been passed through the passage hole 12 formed through that portion of the protuberance portion 11 to face the proximal portion 5, the passage hole 12 extending in a direction perpendicular to the length of the tubular portion 6. Finally, the grommet is fitted and held watertight in the panel hole in a dashpanel P.

As described above, the holding mechanism 9 is formed by the concave surface 10 in the protuberance portion 10 and the insertion hole 12 for holding the fastening band 15 in the predetermined position. Therefore, the displacement of the upwardly-extending wire assembly portion 7 out of position, the displacement of the fastening band 15 out of position, and the loosening of the fastening band 15 are positively prevented. Thus, the upwardly-extending wire assembly portion 7 can be positively held in position easily, and also the wire-installing operation can be carried out easily, so that the efficiency of the operation is enhanced.

Figure 4:
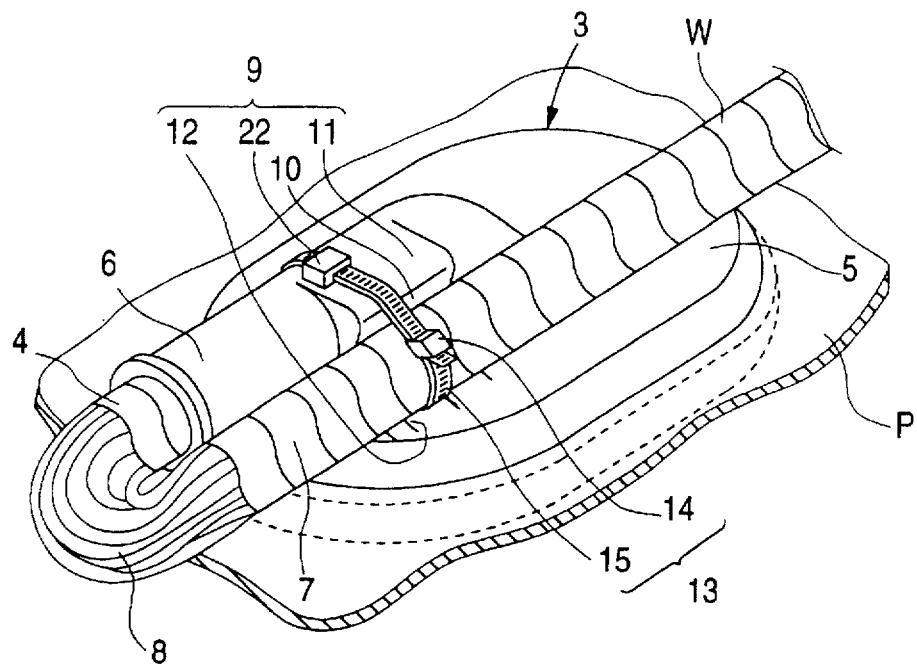
FIG. 4 is a perspective view of a second embodiment of the invention, showing a condition in which the fixing of an upwardly-extending wire assembly portion is completed.

A second embodiment of a harness-fixing construction of a grommet of the invention will now be described in detail with reference to FIGS. 4 and 5. FIG. 4 is a perspective view of this embodiment of the harness-fixing construction of the grommet, and FIG. 5 is a cross-sectional view of this fixing construction of FIG. 4.

As shown in FIG. 4, the second embodiment of the harness-fixing construction of the grommet differs from the first embodiment in that a front passage hole portion 22 is additionally formed on a front side of a protuberance portion 11. Therefore, the same portions as in the first embodiment will be designated by identical reference numerals, respectively, and explanation thereof will be omitted.

In this embodiment, a holding mechanism 9 is formed by the protuberance portion 11 having a concavely-curved surface 10, a passage hole 12 for passing a fastening band 15 therethrough, and the front passage hole portion 22 formed on a front surface of a tubular portion 6. Thanks to the provision of the front passage hole portion 22, the fastening band 15 can be positioned firmly, and also an upwardly-extending wire assembly portion 7 can be held in position more positively.

Figure 5:
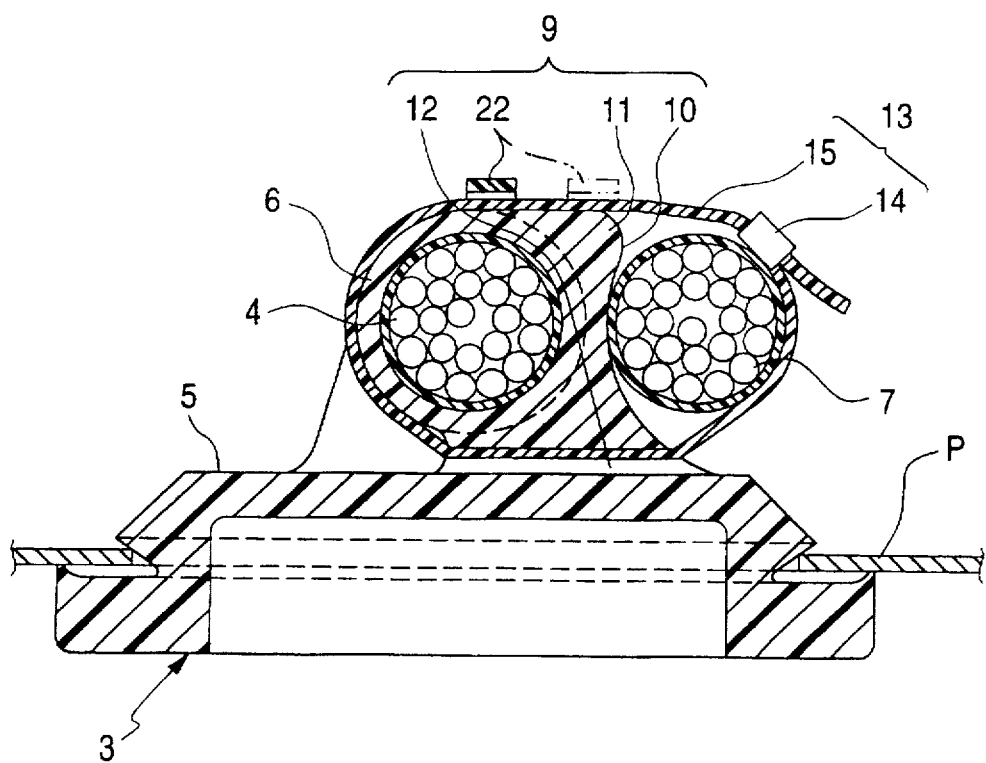
FIG. 5 is a cross-sectional view of the embodiment of FIG. 4.

If the front passage hole portion 22 is provided close to the upwardly-extending wire assembly portion 7 as indicated in dots-and-dash lines in FIG. 5, the position limitation effect is enhanced.

Figure 6A:
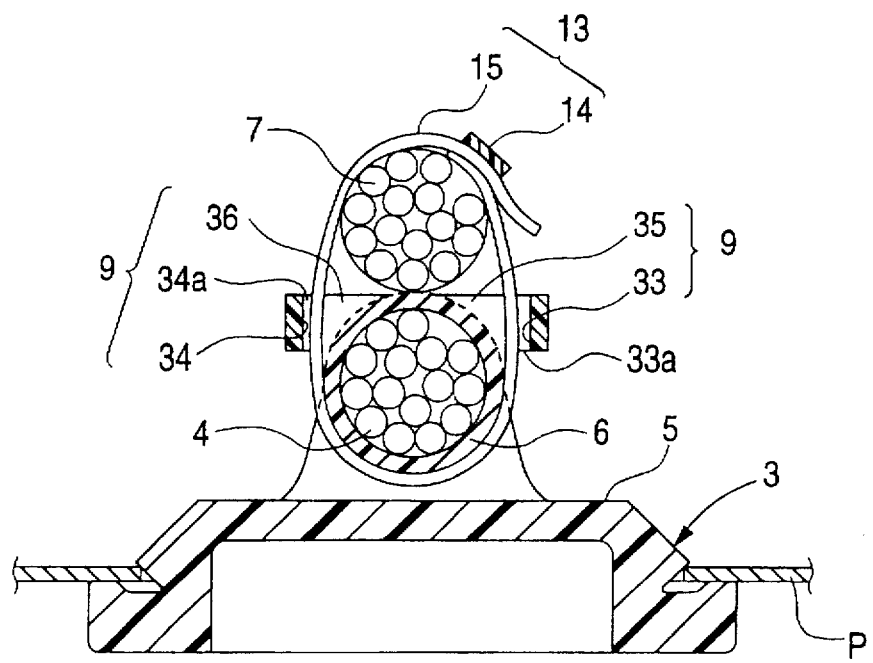
FIG. 6A is a cross-sectional view of a third embodiment of the invention, showing a condition in which the fixing of an upwardly-extending wire assembly portion is completed.
Figure 7:
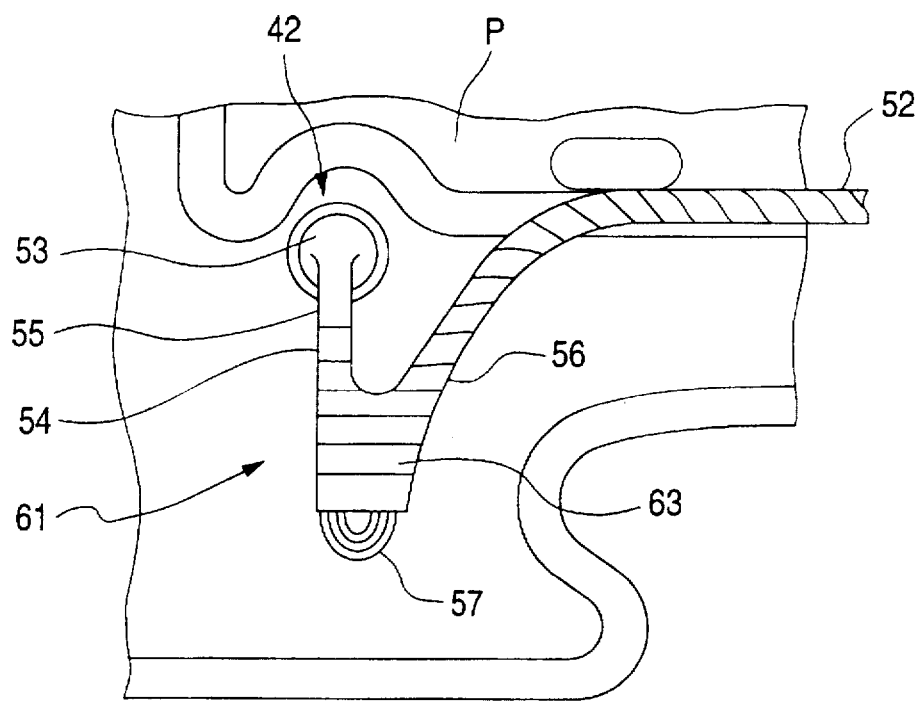
FIG. 7 is a view showing a conventional harness-fixing construction of a grommet.

Next, a third embodiment of a harness-fixing construction of a grommet of the invention will now be described in detail with reference to FIG. 6.A FIG. 6A is a cross-sectional view of this embodiment of the harness-fixing construction of the grommet. The same portions as in the first embodiment will be designated by identical reference numerals, respectively, and explanation thereof will be omitted.

As shown in FIG. 6A, in this embodiment of the harness-fixing construction of the grommet, an upwardly-extending wire assembly portion 7 is disposed on a front side (upper side in FIG. 6A) of a tubular portion 6. A holding mechanism 9 is formed by passage hole portions 33 and 34 for passing a fastening band 15 therethrough, the passage hole portions 33 and 34 being formed respectively on opposed side portions of protuberances 35 and 36 formed on the front side of the tubular portion 6.

Figure 6B:
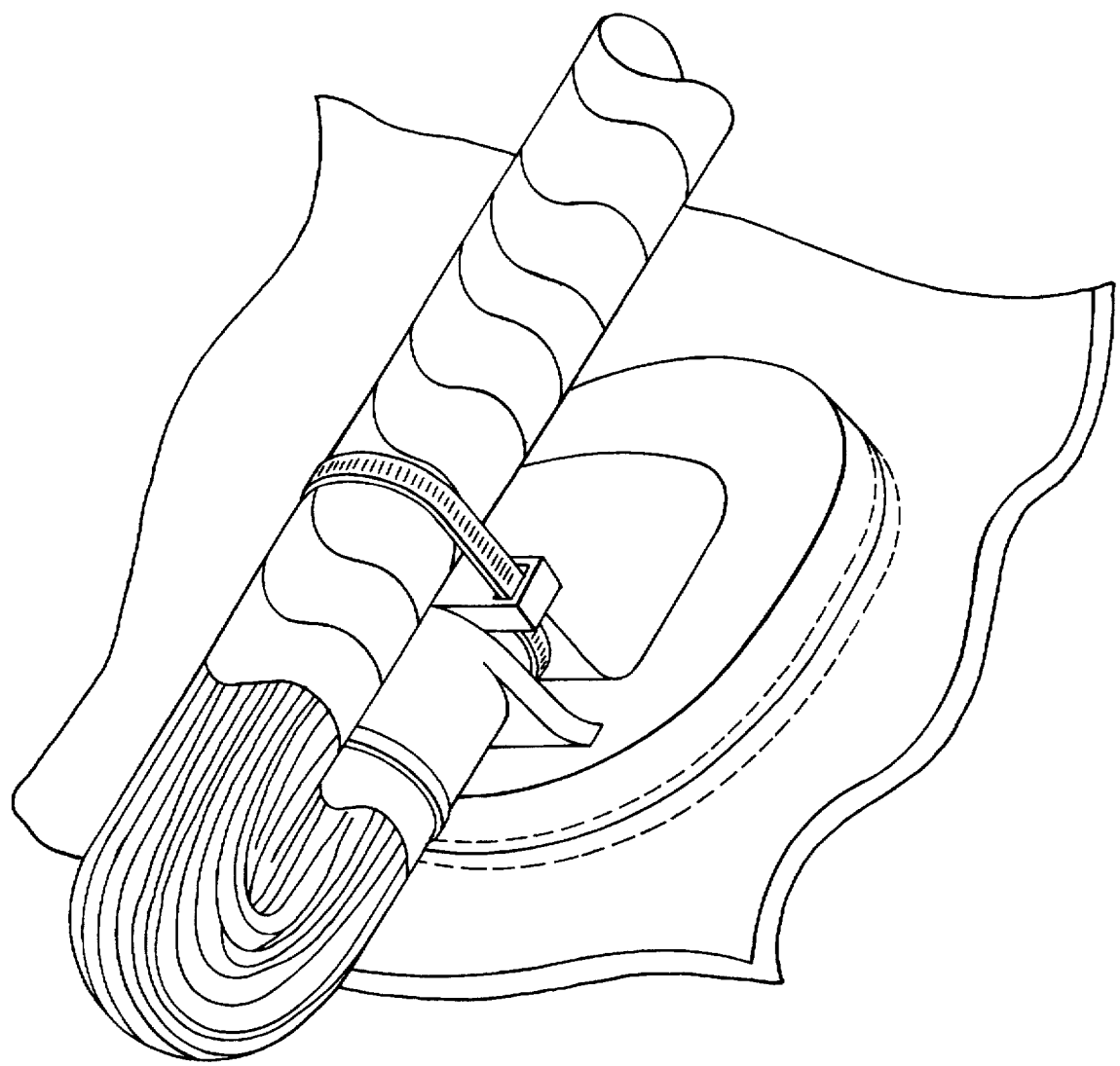
FIG. 6B is an isometric view of the third embodiment of the invention.

Preferably, band outlets 33a and 34a of the passage hole portions 33 and 34 are provided as close to the position of holding of the upwardly-extending wire assembly portion 7 as possible. FIG. 6B is an isometric view of the third embodiment of the invention.

The present invention is not to be limited to the above embodiments, and various modifications can be suitably made. For example, some advantages of the present invention can be achieved even if the holding mechanism has only the protuberance portion having a concave surface.

As described above, in the harness-fixing construction of the grommet according to the invention, the holding mechanism for stably holding the upwardly-extending wire assembly portion in the predetermined position is formed at least on the predetermined portion of the proximal portion or the tubular portion of the grommet.

The holding mechanism is formed by at least one passage hole for holding the fixing member or by the protuberance portion having the concave surface for holding the upwardly-extending wire assembly portion in an embracing manner.

With this construction, the fixing member can be positively fixed in the predetermined position, thereby preventing the displacement or loosening of the upwardly-extending wire assembly portion. Thus, the upwardly-extending wire assembly portion can be firmly held in the predetermined position, and the efficiency of the operation can be enhanced.

What is claimed is:

1. A grommet in combination with a wire, comprising:
    a proximal portion for holding said wire;
    a tubular portion formed integrally with said proximal portion for directing said wire downwardly,
    wherein said wire includes a downward wire portion downwardly extended from said tubular portion, a drain portion provided by bending said downward wire portion substantially into a U-shape and a upward wire portion upwardly extended from said drain portion;
    a fixing member fixing said upward wire portion to said tubular portion; and
    a holding mechanism for holding said upward wire portion in a predetermined position, said holding mechanism formed at least on either said proximal portion or said tubular portion.

2. The grommet in combination with a wire of claim 1, wherein said holding mechanism includes a passage hole for holding said fixing member.

3. The grommet in combination with a wire of claim 2, wherein said passage hole is formed around said tubular portion and extended in a direction perpendicular to a length of said tubular portion.

4. The grommet in combination with a wire of claim 3, wherein a front hole is formed on said tubular portion for holding said fixing member.

5. The grommet in combination with a wire of claim 4, wherein said front hole is formed proximate said upward wire portion.

6. The grommet in combination with a wire of claim 1, wherein said holding mechanism includes passage holes for holding said fixing member.

7. The grommet in combination with a wire of claim 6, wherein said passage holes are formed respectively on opposite sides of a front side of said tubular portion.

8. The grommet in combination with a wire of claim 7, wherein said passage holes are formed proximate said upward wire portion.

9. The grommet in combination with a wire of claim 1, wherein said fixing member includes a band.

10. The grommet in combination with a wire of claim 1, wherein said holding mechanism includes a protuberance portion reducing a movement of said upward wire portion.

11. The grommet in combination with a wire of claim 1, wherein said holding mechanism includes a protuberance portion having a concave surface for holding said upward wire portion.

12. The grommet in combination with a wire of claim 11, wherein said protuberance portion is integrally formed with said proximal portion and said tubular portion.

13. The grommet in combination with a wire of claim 11, wherein said concave surface is extended in a direction of a length of said tubular portion.

14. The grommet in combination with a wire of claim 1, wherein said holding mechanism includes a passage hole for holding said fixing member, and a protuberance portion having a concave surface for holding said upward wire portion.

15. The grommet in combination with a wire according to claim 2 wherein the fixing member includes a band and a lock member.

16. The grommet in combination with a wire according to claim 2 wherein the passage hole is located adjacent to the proximal portion and the passage hole has at least one interior surface that extends in a generally coplanar direction as the proximal portion.

* * * * *